United States Patent
Shibayama

(10) Patent No.: US 7,012,502 B2
(45) Date of Patent: Mar. 14, 2006

(54) SENSOR AND MANUFACTURING METHOD THEREOF

(75) Inventor: Susumu Shibayama, Anjo (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/849,383

(22) Filed: May 20, 2004

(65) Prior Publication Data

US 2004/0212477 A1    Oct. 28, 2004

Related U.S. Application Data

(62) Division of application No. 10/359,210, filed on Feb. 6, 2003, now abandoned.

(30) Foreign Application Priority Data

| Feb. 7, 2002 | (JP) | ............................... 2002-30925 |
| Dec. 12, 2002 | (JP) | ............................. 2002-360600 |

(51) Int. Cl.
*H01C 3/04* (2006.01)
(52) U.S. Cl. .................... 338/28; 338/229; 374/185
(58) Field of Classification Search .................. 338/28, 338/229; 374/185, 208
See application file for complete search history.

(56) References Cited

U.S. PATENT DOCUMENTS

| 3,952,276 | A | | 4/1976 | Walch et al. |
| 4,243,968 | A | * | 1/1981 | Scott ............................ 338/28 |
| 4,246,786 | A | * | 1/1981 | Wiemer et al. ............... 374/165 |
| 4,527,909 | A | | 7/1985 | Dale et al. |
| 5,481,240 | A | * | 1/1996 | Fukaya et al. ............. 338/22 R |
| 5,741,072 | A | * | 4/1998 | Yamaguchi et al. ......... 374/179 |
| 5,743,646 | A | * | 4/1998 | O'Connell et al. .......... 374/148 |
| 5,749,656 | A | * | 5/1998 | Boehm et al. ............... 374/185 |
| 5,753,835 | A | * | 5/1998 | Gustin ........................ 73/866.5 |
| 5,817,920 | A | * | 10/1998 | Kuisell et al. .............. 73/23.31 |
| 5,949,324 | A | * | 9/1999 | Segler et al. .................. 338/28 |
| 6,305,841 | B1 | * | 10/2001 | Fukaya et al. ............... 374/185 |
| 6,698,922 | B1 | * | 3/2004 | Adachi et al. ............... 374/208 |
| 2002/0061049 | A1 | | 5/2002 | Adachi et al. |
| 2002/0125984 | A1 | | 9/2002 | Muziol et al. |
| 2003/0147452 | A1 | | 8/2003 | Adachi et al. |

FOREIGN PATENT DOCUMENTS

| FR | 2679332 | 1/1993 |
| GB | 2203554 | 10/1988 |
| JP | 54-159684 | 12/1979 |
| JP | 55039006 | 3/1980 |

(Continued)

*Primary Examiner*—Karl D. Easthom
(74) *Attorney, Agent, or Firm*—Nixon & Vanderhye PC

(57) ABSTRACT

A temperature sensor comprises a thermistor element, a metal tube into which the thermistor element is inserted, two electrode wires joined to the thermistor element, two lead wires, which are covered by covering tubes with uncovered portions remaining and joined to the electrode wires, respectively, at the uncovered portions, and a housing having an inner hollow space into which the electrode wires and the lead wires are accommodated together with a resin. The sensor further comprises an insulating case disposed inside the housing and provided with a partition section for separating the joined portions of the electrode wires and the lead wires, the electrode wires and the lead wires from each other, and the inside of the insulating case is filled up with resin in a state that an opened end of the metal tube, the electrode wire and portions of the covered lead wires and uncovered portions thereof are inserted in the insulating case.

13 Claims, 6 Drawing Sheets

FOREIGN PATENT DOCUMENTS

| | | |
|---|---|---|
| JP | 55-125422 | 9/1980 |
| JP | 01253621 | 10/1989 |
| JP | 6-174557 | 6/1994 |
| JP | 11-295156 | 10/1999 |

* cited by examiner

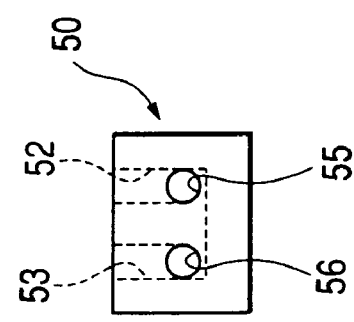
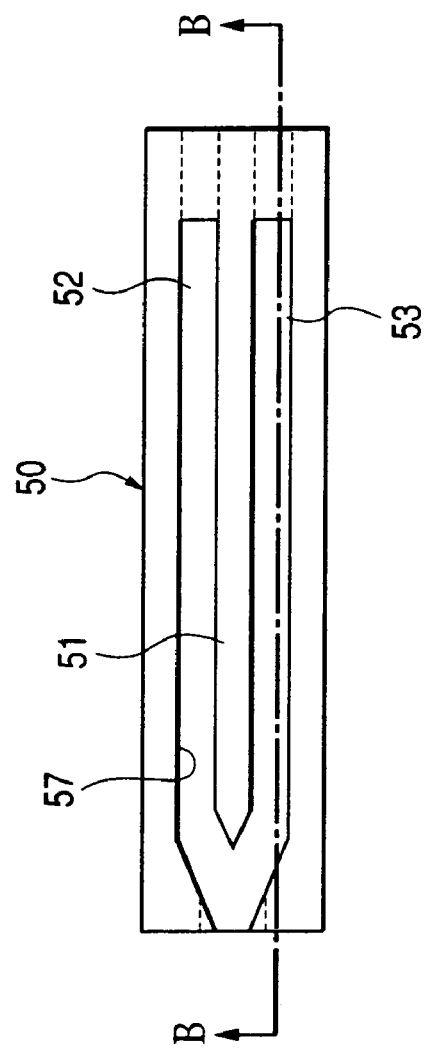
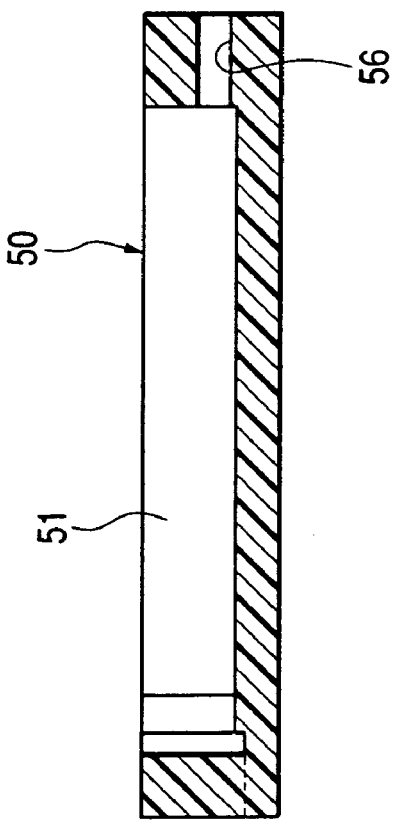
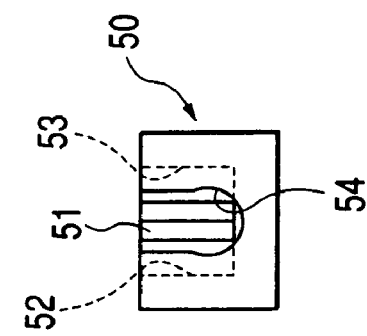

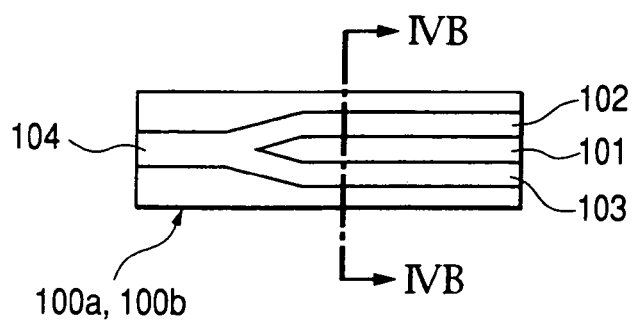
FIG. 4A
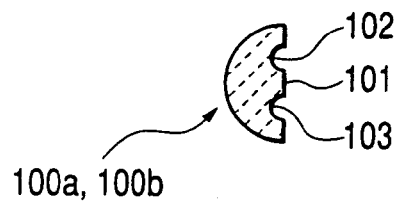
FIG. 4B
FIG. 5
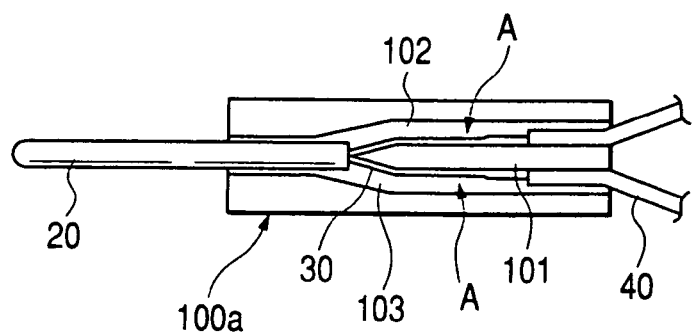
FIG. 6B  FIG. 6A  FIG. 6C
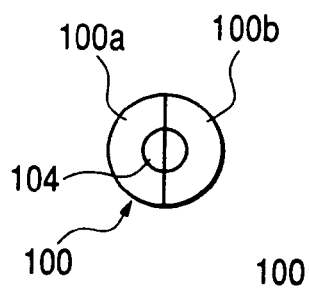 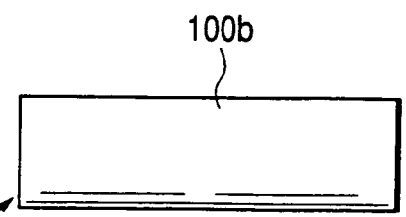 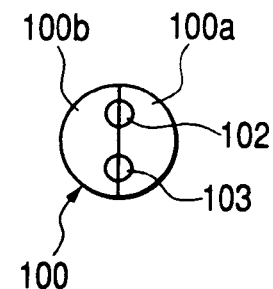

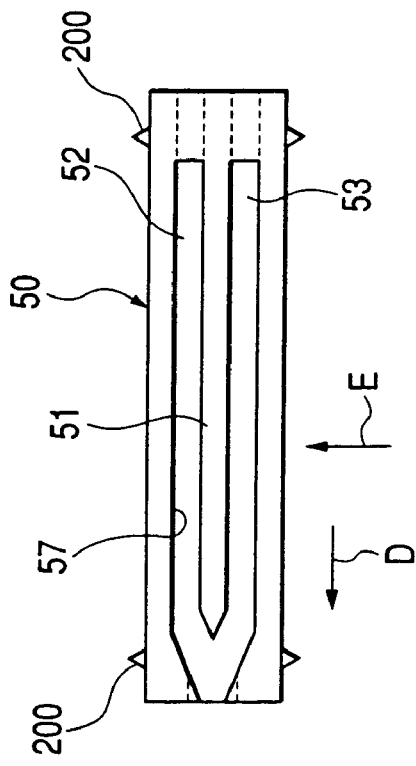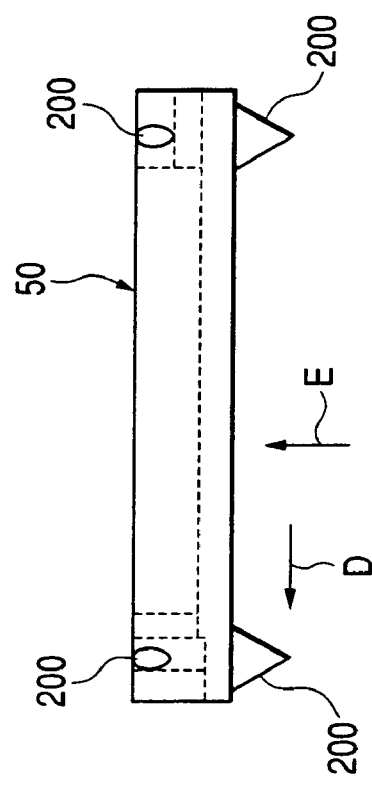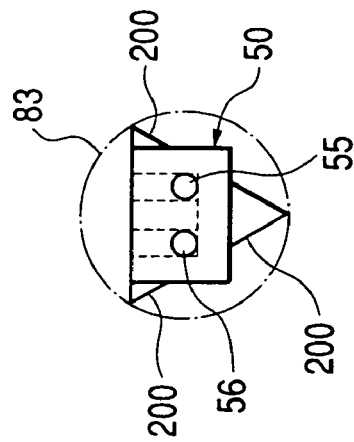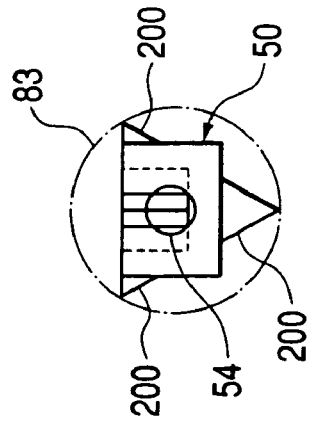
FIG. 7A
FIG. 7B
FIG. 7C
FIG. 7D

SENSOR AND MANUFACTURING METHOD THEREOF

This application is a division of application Ser. No. 10/359,210, filed Feb. 6, 2003, the entire contents which is hereby incorporated by reference in this application.

BACKGROUND OF THE INVENTION

The present invention relates to a sensor, particularly, a temperature sensor, having an element generating an electric signal such as thermistor element of which resistance is variable in response to a temperature and also relates to a method of manufacturing such sensor.

In a prior art, Japanese Patent Laid-open (KOKAI) Publication No. SHO 54-159684 discloses a connector in which a lead wire and a connector pin are joined together at a plurality portions and such joined portions are accommodated in an insulating sleeve, which is filled up with thermoplastic resin such as epoxy resin. Furthermore, Japanese Patent Laid-open (KOKAI) Publication No. HEI 6-174557 discloses a sensor in which a mica plate is disposed between a plurality of joined portions of an element wire of a detection portion and an element wire of a lead wire, and the surrounding of the plural joined portions is covered by an insulating tube. A metal tube is disposed around the insulating tube and the lead wire and the resin such an epoxy resin then fills the inside of the metal tube.

In the connector of the former prior art, however, uncovered portions of a plurality of element wires near the joined portions are arranged near one by one, so that there is a fear of short-circuiting at a time of pouring the resin.

On the other hand, in the sensor of the latter prior art, such short-circuiting may be prevented by the location of the mica plate. However, the respective element wires of the detection portions and the respective element wires of the lead wires are disposed near one by one, and moreover, such element wires include portions not covered by the insulating tubes, so that there is also a fear of short-circuiting at the time of pouring the resin.

SUMMARY OF THE INVENTION

An object of the present invention is to substantially eliminate defects or drawbacks encountered in the prior art mentioned above and to provide a sensor of the type in which an element side electrode and a lead wire are disposed in a space of a housing and a resin also fills the space so as to prevent short-circuiting at the time of filling of the resin and also provide a method of manufacturing such sensor.

This and other objects can be achieved according to the present invention by providing, in one aspect, a sensor comprising:

a thermistor element for generating an electric signal;

a metal tube having one opened end and another one closed end, into which the thermistor element is inserted;

a plurality of electrode wires joined to the thermistor element so as to project outward over the opened end of the metal tube;

a plurality of lead wires, which are covered by covering tubes with uncovered portions remaining and joined to the electrode wires, respectively, at the uncovered portions;

a housing having an inner hollow space into which the electrode wires and the lead wires are accommodated together with a resin as a filler;

an insulating case disposed inside the housing and provided with a partition section for separating the joined portions of the electrode wires and the lead wires from each other, the respective electrode wires from each other and the respective lead wires from each other; and an insulating material which fills inside the insulating case in a state that the opened end of the metal tube and the electrode wires extending therefrom are inserted in the insulating case and portions of the covered lead wires and uncovered portions thereof are also inserted therein.

In a preferred embodiment of this aspect, the following features may be additionally provided.

The insulating case may be formed of a resin material, glass and the like.

The insulating material is an epoxy resin, which constitutes a resin filling layer in the insulating case.

The insulating case has a cylindrical columnar shape and is composed of longitudinally divided two case halves, having substantially symmetrical shape, each provided with longitudinal half of inner hollow space.

The insulating case may be provided with a rib member extending in a direction normal to a longitudinal resin flowing direction at a time of feeding the resin in the housing and abutting against an inner peripheral surface of the housing. The rib member comprises a plurality of rib pieces which are formed to outer peripheral surfaces of the insulating case at both longitudinal end portions thereof. The rib member may comprises three rib pieces each having a conical shape or four rib pieces each having a sectorial shape.

In another aspect, the above object can be also achieved by providing a method of manufacturing a sensor which generally comprises a thermistor element for generating an electric signal, a metal tube having one opened end and another one closed end, into which the thermistor element is inserted, a plurality of electrode wires joined to the thermistor element so as to project outward over the opened end of the metal tube, a plurality of lead wires, which are covered by covering tubes with uncovered portions remaining and joined to the electrode wires, respectively, at the uncovered portions, and a housing having an inner hollow space into which the electrode wires and the lead wires are accommodated together with a resin as a filler, the sensor manufacturing method comprising the steps of;

preparing an insulating case provided with a partition section for separating the joined portions of the electrode wires and the lead wires from each other, the respective electrode wires from each other and the respective lead wires from each other;

inserting the opened end of the metal tube, the electrode wires extending therefrom and portions of the covered lead wires and uncovered portions thereof into the insulating case;

joining the electrode wires and the lead wires to each other;

filling the insulating case with an insulating material;

inserting thereafter the insulating case in the housing; and filling the hollow space of the housing with resin.

In this method, the resin is fed into the housing through an injection molding process.

Furthermore, in a preferred example of the present invention, the sensor is a temperature sensor provided for an internal combustion engine of a vehicle for detecting a temperature of an exhaust gas of an exhaust tube of the internal combustion engine.

According to the sensor and its manufacturing method of the characters mentioned above, the insulated state of portions which may be short-circuited, that is, the joined portions of the electrode wire and the lead wire, a portion of the electrode wire projecting over the metal tube and the uncovered portion of the lead wire can be surely maintained in the insulating case. Thus, the short-circuiting at the time of injecting the resin in the housing can be prevented from causing.

When the insulating case is formed from glass, heat resisting property can be further improved.

In a case where the insulating case is displaced by the resin filling pressure in a direction normal to the resin flow direction in the insulating case, a certain force maybe applied to the joined portion of the electrode wire and the lead wire, which will adversely result in imperfect contact therebetween.

According to the present invention in which the rib member is provided for the insulating case, since the insulating case is positioned in the direction normal to the resin flow direction, the fear of undesired displacement of the insulating case will be substantially eliminated.

The nature and further characteristic features of the present invention will be made more clear from the following description made with reference to the accompanying drawings.

BRIEF DESCRIPTION OF THE DRAWINGS

In the accompanying drawings:

FIG. 3 represents an insulating case of the sensor of FIG. 1 and includes FIG. 3A of a plan view of the insulating case, FIG. 3B of a sectional view thereof taken along the line IIIB—IIIB in FIG. 3A, FIG. 3C of a left side view of FIG. 3B and FIG. 3D of a right side view of FIG. 3B;

FIG. 4 relates to a second embodiment of a sensor of the present invention and represents one of divided case halves of an insulating case and includes FIG. 4A showing a front view thereof and FIG. 4B showing a sectional view taken along the line IVB—IVB in FIG. 4A;

FIG. 5 illustrates a state that an integral structure of an essential portion of the sensor of FIG. 4 is accommodated in one divided case half;

FIG. 6 is an illustration of the combined insulating case, including FIG. 6A of a front view, FIG. 6B of a left side end view and FIG. 6C of a right side end view thereof;

FIG. 7 represents a third embodiment of a sensor according to the present invention and includes FIG. 7A of a plan view of an insulating case, FIG. 7B of a front view thereof, FIG. 7C of a left side view thereof and FIG. 7D of a right side view thereof.

DESCRIPTION OF THE PREFERRED EMBODIMENTS

A first embodiment of a sensor (i.e., temperature sensor for detecting a temperature of an exhaust gas from an internal combustion engine of a vehicle, according to the present invention, will be first described with reference to FIGS. 1 to 3.

Figure 1:
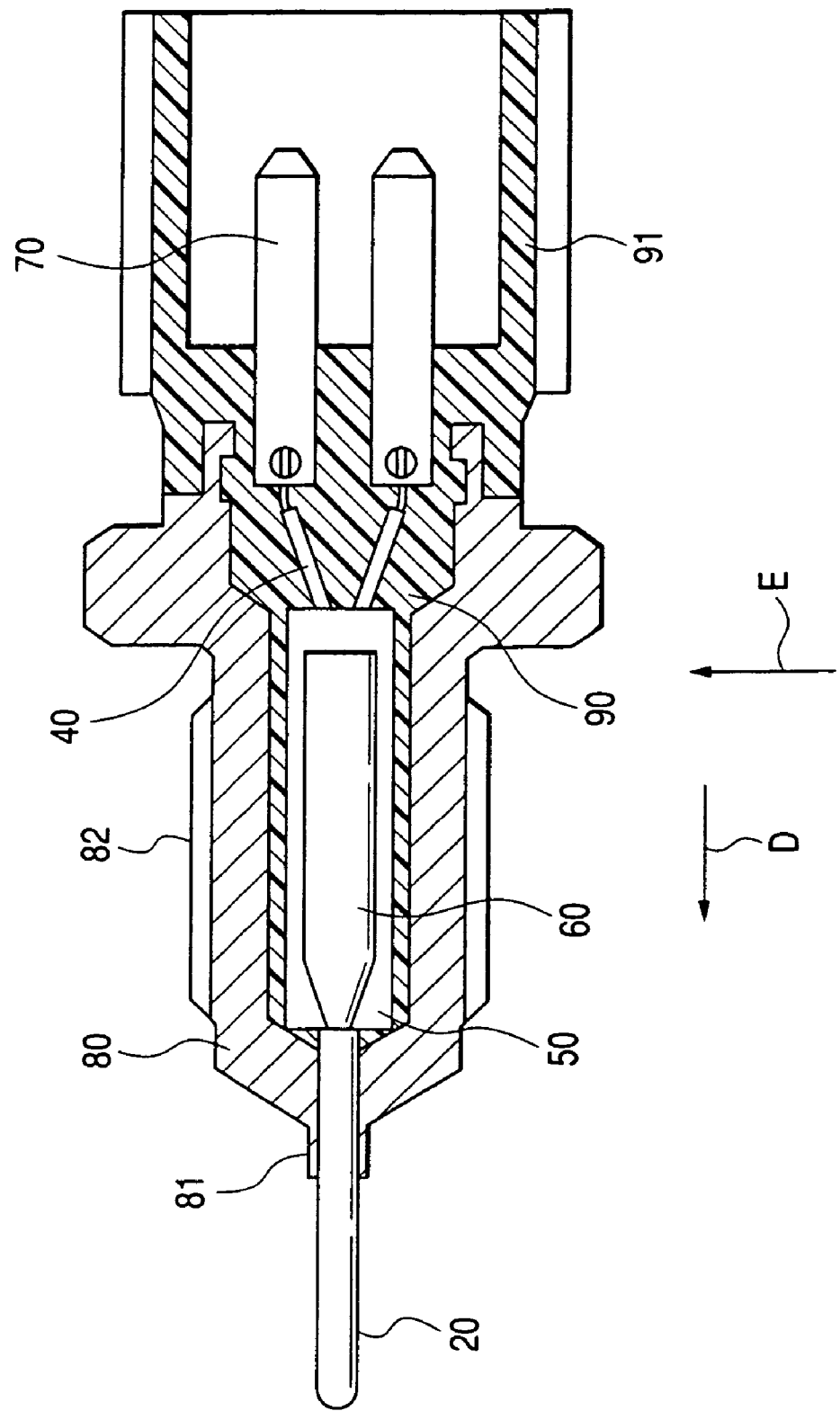
FIG. 1 is a sectional view of a sensor, i.e., temperature sensor, according to a first embodiment of the present invention.

With reference to FIGS. 1 to 3, the temperature sensor is provided with a thermistor element 10, for high temperature use, capable of withstanding the use in an environment of exhaust gas having a temperature of more than 500° C. This thermistor element 10 is for generating an electric signal and composed of a ceramics or silicone semiconductor and has a resistance variable in response to a temperature. The thermistor element 10 is inserted into a metal tube 20 composed of a stainless steel tube having one end opened and the other end closed, constituting a bottomed cylindrical metal structure.

To the thermistor element 10, a pair of electrode wires 30 composed of Fe—Cr wire are joined so as to project outward from the opened end of the metal tube 20 when the thermistor element 10 is inserted into the metal tube 20. Furthermore, a pair of lead wires 40 covered by covering tubes are electrically joined by means of, for example, welding, to the projecting end portions of the electrode wires 30, respectively, so as to provide joined portions A (FIG. 2B).

Portions near the joined portions A of the electrode wires 30 and the lead wires 40 are accommodated in an insulating case 50 formed of a material such as nylon having an electrically insulating property. An epoxy resin is fed so as to fill inside the insulating case 50 to form a resin filler layer 60.

The insulating case 50 has approximately a rectangular shape in section, having an inner hollow space for accommodating the joined portions A. This inner space is sectioned into first and second spaces 52 and 53 by means of partition member 51. A tube insertion hole 54 is formed to one longitudinal end side of the insulating case 50 so as to communicate with the first and second spaces 52 and 53, and on the other hand, a first lead wire insertion hole 55 communicated with the first space 52 and a second lead wire insertion hole 56 communicated with the second space 53 are formed to the other longitudinal end side of he insulating case 50, respectively. Furthermore, these first and second spaces 52 an 53 are opened outward through a common opening 57, through which the epoxy resin is fed into these spaces 52 and 53.

The lead wires 40 have end portions extending outward the insulating case 50 and a pair of metal terminals 70 are joined to these end portions by means of, for example, welding.

Figure 2A:
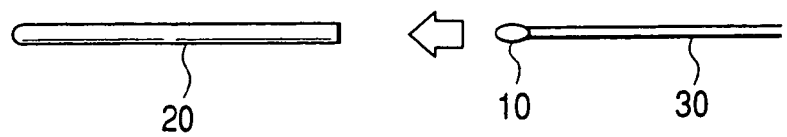
FIG. 2 includes illustrations of FIGS. 2A to 2D of the sensor of FIG. 1 for the purpose of explaining manufacturing steps thereof.
Figure 2B:
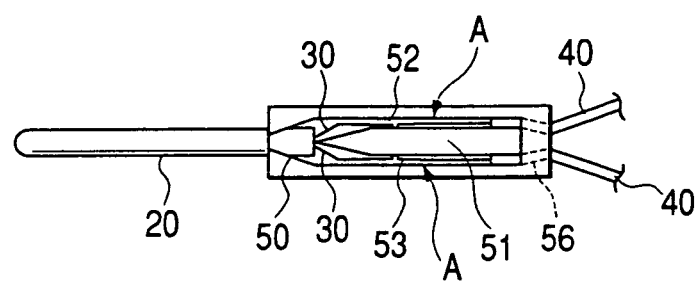
Figure 2C:
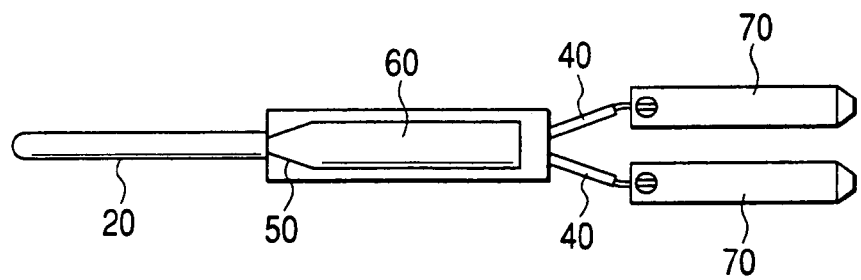

According to the manner mentioned above, the thermistor element 10, the metal tube 20, the electrode wires 30, the lead wires 40 and the terminals 70 are formed integrally as an integral structure as shown in FIG. 2C. This integral structure is inserted and fitted into a cylindrical housing 80 formed of a metal material such as stainless steel and provided with a staged (different level) portion. Then, an insulating material such as nylon is fed into the housing 80 and a connector housing 9 is thereafter injection-molded.

Further, with reference to FIG. reference numeral 90 represents a resin mold portion which is formed through an injection molding and to which the connector housing 91 extending from the housing 80 is integrally formed. The connector hosing 91 has an inner space into which the one end portions of the terminals 70 project.

In the integral structure mentioned above, the bottom side of the metal tube 20 projects outside the housing 80, and the metal tube 20 is secured air-tightly to the housing 80 as an intermediate thin thickness portion 81 thereof. This thin thickness portion 81 is calked and welded by means of laser welding. The housing 80 has an outer peripheral surface to which male threaded portion 82 is formed, and the temperature sensor of the present invention is then mounted to an exhaust pipe of an internal combustion engine of a vehicle, not shown through an engagement of this male threaded portion 82 with a female threaded portion formed to the exhaust pipe in a manner such that the bottom side of the metal tube 20 is positioned inside the exhaust pipe. According to such arrangement, the resistance of the thermistor element 10 varies in response to the temperature change of the exhaust and the varying resistance is detected as temperature change of the exhaust gas.

The temperature sensor of the structure mentioned above will be manufactured in accordance with steps or processes described with reference to FIGS. 2A to 2D.

That is, the thermistor element 10 is inserted into the metal tube 20 as shown in FIG. 2A. Then, the opened end portion of the metal tube 20 is inserted into the tube insertion hole 54 so that the first and second lead wires 40, 40 are inserted through the first and second lead wire insertion holes 55 and 56, respectively. In this process, portions of the cover tubes of the lead wires 40, 40 are inserted into the first and second spaces 52 and 53, and the lead wires 40, 40 are thereafter joined to the electrode wires 30, 30, respectively, so that the joined portions A of the electrode wires 30, 30 and the lead wires 40, 40 are accommodated respectively in the first and second spaces 52 and 53. Under the state mentioned above, a portion between the two electrode wires 30, 30, a portion between the two lead wires 40, 40 and a portion between the two joined portions A, A are separated respectively from each other by means of partition section 51 as shown in FIG. 2B.

Next, with reference to FIG. 2C, the first and second spaces 52 and 53 are filled up with the epoxy resin, and then, the end portions of the lead wires 40 extending outside the insulating case 50 are joined to the terminals 70. According to this manner, an insulated state of portions which may be short-circuited, that is, the insulated state of the portions of the electrode wires 30 projecting over the metal tube 20, the joined portions A, and the uncovered portions of the lead wires 40 can be ensured in the insulating case 50.

Figure 2D:
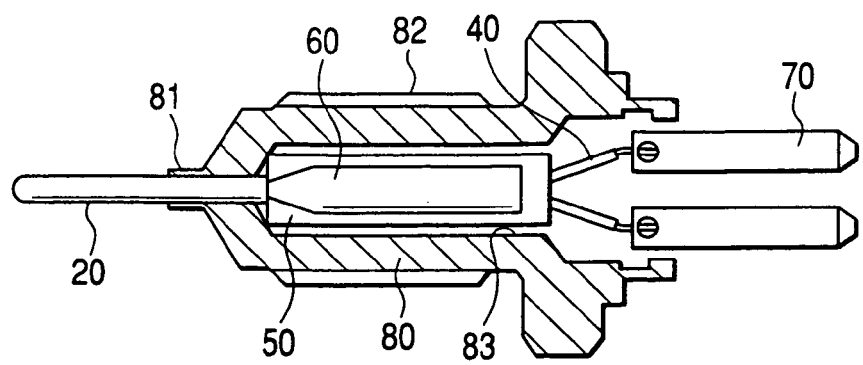

In the next step, as shown in FIG. 2D, the integral structure provided with the joined terminals 70 is inserted into the housing 80. Thereafter, the resin is fed into the housing 80, thus injection molding the resin mold portion 90. Then, the thin thickness portion 81 of the housing 80 is calked and welded to the metal tube 20 through the laser welding process.

According to the steps or processes mentioned above with reference to FIGS. 2A to 2D, the temperature sensor of the present invention represented by FIG. 1 is manufactured and completed.

In the above manufacturing processes, the injection molding of the resin mold portion 90 will be performed by using a known injection molding machine in the following conditions.

That is, for example, when liquid crystal polymer is used as material for the resin mold portion 90, the injection molding is performed at a temperature of a cylinder of 340 to 380° C., at a temperature of a metal mold of 120 to 180° C., at an injection pressure of 100 to 140 Mpa. and for injecting time of 1.5 sec.

According to this first embodiment, the insulated state of the portions which may be short-circuited, that is, the insulated state of the two electrode wires 30, the two lead wires 40 and the two joined portions A thereof can be separated from each other by means of partition section 51, and in such state, the epoxy resin is fed to fill the first and second spaces 52 and 53, so that the insulated state of the portions which maybe short-circuited can be surely maintained in the insulating case 50. Thus, the short-circuiting at the injection molding process of the resin mold 90 can be prevented from causing.

According to the described embodiment, although the epoxy resin is fed into the nylon insulating case 50 as one typical example, in an alternation, the heat resisting property can be further improved by feeding a silicone binder into the insulating case 50 made of PTFE.

[Second Embodiment]

In the first embodiment, the nylon insulating case 50 is utilized, in this second embodiment, a cylindrical insulating case 100 is composed of two longitudinally divided case halves 100a and 100b formed from glass.

This second embodiment will be explained with reference to FIGS. 4 to 6, in which FIG. 4 represents one of divided case halves cases 100a or 100b and includes FIG. 4A showing a front view thereof and FIG. 4B showing a sectional view taken along the line IVB—IVB in FIG. 4A, FIG. 5 illustrating a state that the integral structure of the essential portion of the temperature sensor is accommodated in one divided case half 100a (that is, the joined portion A is accommodated therein), and FIG. 6 is an illustration of the combined insulating case 100 including FIG. 6A of front view, FIG. 6B of left side end view and FIG. 6C of right side end view.

As shown in FIGS. 4 and 5, the divided case halves 100a and 100b each has a shape obtainable by vertically dividing a cylindrical columnar insulating case 100 into two halves having an inner space into which the joined portions A and its near portions are to be accommodated. This inner space is sectioned into first and second spaces 102 and 103 by means of partition section 101, and longitudinal one end side of the combined case halves 100a and 100b is formed with a tube insertion hole 104 which communicate with the first and second spaces 102 and 103 as shown in FIG. 4A. That is, the longitudinally divided case halves 100a and 100b are respectively formed with semi-circular grooves (104) which are formed into the circular hole 104 when combined.

The temperature sensor of this second embodiment is assembled and manufactured in the following manner.

The thermistor element 10 is first inserted into the metal tube 20 in the state shown in FIG. 2A and the electrode wires 30 and the lead wires 40 are joined together.

Next, as shown in FIG. 5, the opened end side of the metal tube 20 is inserted into tube insertion groove 104 of one divided case half 100a and the lead wires 40, 40 are inserted (fitted) into the first and second spaces 102 and 103 of the one divided case half 100a. Moreover, the joined portion A of one electrode wire 30 and one lead wire 40 is accommodated in the first space 103 and the other one joined portion A of the other one electrode wire 30 and the other one lead wire 40 is also accommodated in the second space 103 in the state shown in FIG. 5.

Under the state mentioned above, the portion between the two electrode wires 30, 30, the portion between the two lead wires 40, 40 and the portion between the two joined portions A, A are separated respectively from each other by means of partition section 101 as shown in FIG. 5.

Thereafter, the first and second spaces 102 and 103 of the respective divided case halves 100a and 100b are filled up with an insulating material such as cement having an electrically insulating property, and both these divided case halves 100a and 100b are then assembled into the case 100. In this process, the divided case halves 100a and 100b are joined and bonded by the cement as an integral structure of the case 100.

According to this manner, the insulated state of the portions which may be short-circuited, that is, the insulated state of the portions of the electrode wires 30 projecting over the metal tube 20, the joined portions A, and the uncovered portions of the lead wires 40 can be ensured in the insulating case 100.

In the next step, as like as shown in FIG. 2D, the terminals 70 are joined to the end portions of the respective lead wires 40 extending outward the insulating case 100, and after the integral structure provided with the joined terminals 70 is inserted into the housing 80, the resin is fed so as to fill the housing 80, thus injection molding the resin mold portion 90. Then, the thin thickness portion 81 of the housing 80 is calked and welded to the metal tube 20 through the laser welding process.

According to the steps or processes mentioned above, the temperature sensor of the second embodiment of the present invention is completed and thus manufactured.

Furthermore, in this second embodiment, the insulating case 100 is formed from glass, so that the improved heat resisting property can be obtained.

[Third Embodiment]

The third embodiment is represented by FIG. 7 including FIG. 7A of a plan view of the insulating case 50, FIG. 7B of a front view thereof, FIG. 7C of a left side view thereof and FIG. 7D of a right side view thereof. In this third embodiment, a rib 200 is additionally provided for the insulating case 50 of the first embodiment.

Incidentally, with reference to FIG. 1, an arrow D indicates the flow of the resin in the insulating case 50 at the time of the injection molding of the resin mold portion 90. In the first embodiment mentioned hereinbefore, there may case a case, in accordance with the pressure at the injection molding process, that the insulating case 50 is displaced in a direction E normal to the resin flow direction D. In such adverse case, a certain force maybe applied to the joined portion A of the electrode wire 30 and the lead wire 40, which will cause an imperfect contact.

In order to obviate such defect, in this third embodiment of the present invention, the rib 200 is integrally formed with the insulating case 50. This rib 200 has substantially conical shape extending along the direction E normal to the resin flow direction D, and totally three ribs 200 are formed to the insulating case 50 at longitudinal one and the other end side outer peripheral surfaces of the insulating case 50, respectively, as shown in FIG. 7.

In the state shown in FIG. 7D, in which the insulating case 50 is inserted into the housing 80, the front end portions of the ribs 200 abut against the inner peripheral surface of the housing 80 to thereby position the insulating case in the direction E.

According to this third embodiment, as mentioned above, since the positioning of the insulating case 50 in the direction E can be achieved by means of ribs 200, the displacement of the insulating case 50 in the direction E by the pressure at the injection molding process can be effectively prevented and the defective imperfect contact between the electrode wire 30 and the lead wire 40 can be prevented from causing.

[Fourth Embodiment]

Figure 8A:
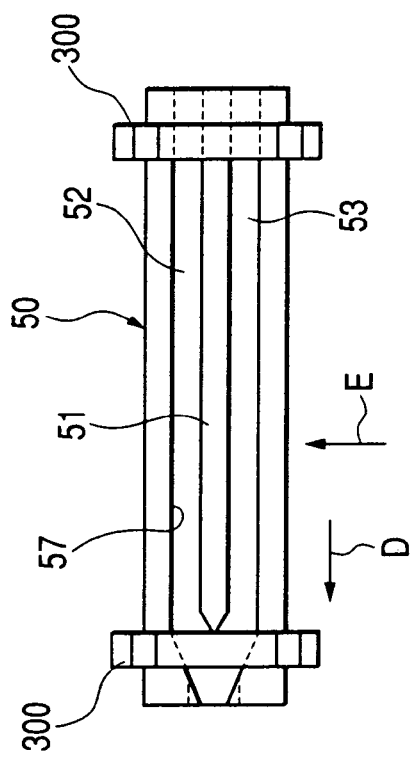
FIG. 8 represents a fourth embodiment of a sensor according to the present invention and includes FIG. 8A of a plan view of an insulating case, FIG. 8B of a front view thereof, FIG. 8C of a left side view thereof and FIG. 8D of a right side view thereof.
Figure 8B:
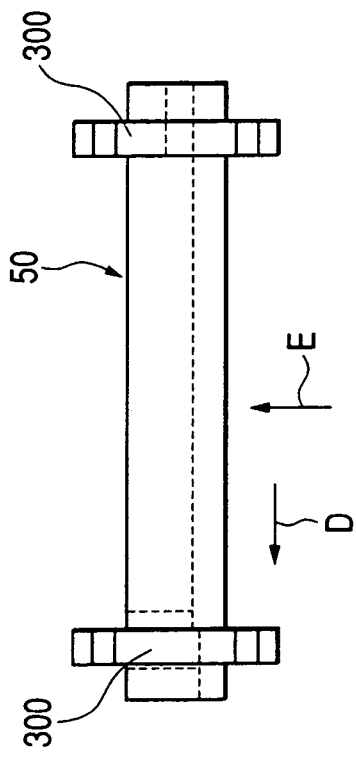
Figure 8D:
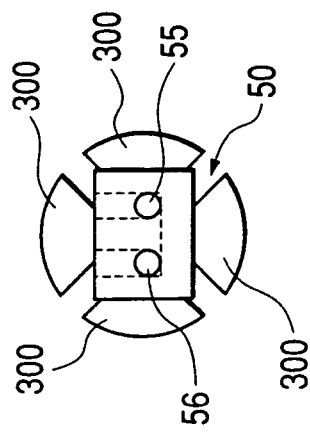
Figure 8C:
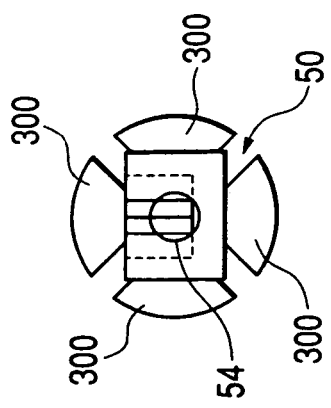

The fourth embodiment is represented by FIG. 8 including FIG. 8A of a plan view of the insulating case 50, FIG. 8B of a front view thereof, FIG. 8C of a left side view thereof and FIG. 8C of a right side view thereof. In this fourth embodiment, the structure of a rib 300 has a different shape from that of the rib 200 of the third embodiment.

With reference to FIG. 8, the rib 300 of this embodiment has a sectorial shape, and totally four ribs 300 are formed to each of the outer peripheral surfaces of the longitudinal end portions of the insulating case 50. In the state that the insulating case 50 provided with such ribs 300 are inserted into the housing 80, the outer peripheral surfaces of the ribs 300 abut against the inner peripheral surface 83 of the housing 80 to thereby position the insulating case 50 in the direction E normal to the resin flow direction D in the housing 80.

According to this fourth embodiment, as mentioned above, since the positioning of the insulating case 50 in the direction E by means of ribs 300 can be performed, the displacement of the insulating case 50 to the direction E by the pressure at the injection molding process can be prevented and the imperfect contact between the electrode wire 30 and the lead wire 40 can be also prevented from causing.

It is further to be noted that the present invention is not limited to the described embodiments and many other changes and modifications may be made without departing from the scopes of the appended claims. For example, the invention is described with reference to the embodiments of the temperature sensor, but it may be applicable to sensors other than such temperature sensors.

What is claimed is:

1. A sensor comprising:
   a thermistor element for generating an electric signal;
   a metal tube having one opened end and another closed end, into which said thermistor element is inserted;
   a plurality of electrode wires joined to the thermistor element so as to project outward over the opened end of the metal tube;
   a plurality of lead wires, which are covered by covering tubes with uncovered portions remaining and joined to the electrode wires, respectively, at the uncovered portions;
   a housing having an inner hollow space into which the electrode wires and the lead wires are accommodated together with a resin as a filler;
   an insulating case disposed inside the housing and provided with a partition section for separating the joined portions of the electrode wires and the lead wires from each other, the respective electrode wires from each other and the respective lead wires from each other; and
   an insulating material which is fed to fill inside the insulating case in a state that the opened end of the metal tube and the electrode wires extending therefrom are inserted in the insulating case and portions of the covered lead wires and uncovered portions thereof are also inserted therein,
   wherein said insulating case is provided with a rib member extending in a direction normal to a longitudinal resin flowing direction at a time of feeding the resin in the housing and abutting against an inner peripheral surface of the housing, and
   wherein said rib member is configured to allow said resin to flow longitudinally therepast.

2. A sensor according to claim 1, wherein said rib member comprises a plurality of rib pieces which are formed to outer peripheral surfaces of the insulating case at both longitudinal end portions thereof.

3. A sensor according to claim 2, wherein each said rib member comprises three rib pieces, each having a conical shape with an apex extending normal to said longitudinal resin flowing direction.

4. A sensor comprising:
a thermistor element for generating an electric signal;
a metal tube having one opened end and another closed end, into which said thermistor element is inserted;
a plurality of electrode wires joined to the thermistor element so as to project outward over the opened end of the metal tube;
a plurality of lead wires, which are covered by covering tubes with uncovered portions remaining and joined to the electrode wires, respectively, at the uncovered portions;
a housing having an inner hollow space into which the electrode wires and the lead wires are accommodated together with a resin as a filler;
an insulating case disposed inside the housing and provided with a partition section for separating the joined portions of the electrode wires and the lead wires from each other, the respective electrode wires from each other and the respective lead wires from each other; and
an insulating material which is fed to fill inside the insulating case in a state that the opened end of the metal tube and the electrode wires extending therefrom are inserted in the insulating case and portions of the covered lead wires and uncovered portions thereof are also inserted therein,
wherein said insulating case is provided with a rib member extending in a direction normal to a longitudinal resin flowing direction at a time of feeding the resin in the housing and abutting against an inner peripheral surface of the housing,
wherein said rib member comprises a plurality of rib pieces which are formed to outer peripheral surfaces of the insulating case at both longitudinal end portions thereof, and
wherein said rib member comprises four rib pieces, each having a sectorial shape including radial side walls and a part circumferential outer periphery extending between said side walls.

5. A sensor according to claim 1, wherein said sensor is a temperature sensor provided for an internal combustion engine of a vehicle for detecting a temperature of an exhaust gas of an exhaust tube of the internal combustion engine.

6. A sensor comprising:
a thermistor element for generating an electric signal;
a metal tube having one opened end and another closed end, into which said thermistor element is inserted;
a plurality of electrode wires joined to the thermistor element so as to project outward over the opened end of the metal tube;
a plurality of lead wires, which are covered by covering tubes with uncovered portions remaining and joined to the electrode wires, respectively, at the uncovered portions;
a housing having an inner hollow space into which the electrode wires and the lead wires are accommodated together with a resin as a filler;
an insulating case disposed inside the housing and provided with a partition section for separating the joined portions of the electrode wires and the lead wires from each other, the respective electrode wires from each other and the respective lead wires from each other; and
an insulating material which is fed to fill inside the insulating case in a state that the opened end of the metal tube and the electrode wires extending therefrom are inserted in the insulating case and portions of the covered lead wires and uncovered portions thereof are also inserted therein,
wherein said insulating case is provided with a rib member extending in a direction normal to a longitudinal resin flowing direction at a time of feeding the resin in the housing and abutting against an inner peripheral surface of the housing, and
wherein said rib member comprises a plurality of rib pieces which are formed to outer peripheral surfaces of the insulating case at both longitudinal end portions thereof, and
wherein said rib pieces are circumferentially spaced apart from each other.

7. A sensor according to claim 1, wherein said resin substantially fills said inner hollow space between the insulating case and the housing along a length of said insulating case.

8. A sensor comprising:
a thermistor element for generating an electric signal;
a metal tube having one opened end and another closed end, into which said thermistor element is inserted;
a plurality of electrode wires joined to the thermistor element so as to project outward over the opened end of the metal tube;
a plurality of lead wires, which are covered by covering tubes with uncovered portions remaining and joined to the electrode wires, respectively, at the uncovered portions;
an insulating case provided with a partition section for separating the joined portions of the electrode wires and the lead wires from each other, the respective electrode wires from each other and the respective lead wires from each other;
an insulating material filling inside the insulating case in a state that the opened end of the metal tube and the electrode wires extending therefrom are inserted in the insulating case and portions of the covered lead wires and uncovered portions thereof are also inserted therein; and
a housing in which said insulating case with wires and insulating material is accommodated,
wherein said insulating case is provided with a rib member extending in a direction normal to a longitudinal axis of the housing and abutting against an inner peripheral surface of the housing at spaced locations about an inner circumferential periphery of the housing.

9. A sensor according to claim 8, wherein said rib member comprises a plurality of discrete rib pieces formed on outer peripheral surfaces of said insulating case at each longitudinal end portion thereof.

10. A sensor according to claim 8, wherein each said rib member comprises three rib pieces, each having a conical shape with an apex extending normal to said longitudinal axis.

11. A sensor according to claim 8, wherein each said rib member comprises four rib pieces, each having a sectorial shape including radial side walls and a part circumferential outer periphery extending between said side walls.

12. A sensor according to claim 8, wherein said sensor is a temperature sensor provided for an internal combustion engine of a vehicle for detecting a temperature of an exhaust gas of an exhaust tube of the internal combustion engine.

13. A sensor according to claim 8, further comprising resin filling an inner hollow space between said insulating case and said housing along a length of said insulating case.

* * * * *